(12) United States Patent
Ravikumar et al.

(10) Patent No.: US 12,155,323 B2
(45) Date of Patent: Nov. 26, 2024

(54) MULTI GENERATOR SYNCHRONIZATION SYSTEM

(71) Applicant: Google LLC, Mountain View, CA (US)

(72) Inventors: Krishnanjan Gubba Ravikumar, Pullman, WA (US); Mahipathi Reddy Appannagari, San Jose, CA (US)

(73) Assignee: Google LLC, Mountain View, CA (US)

( * ) Notice: Subject to any disclaimer, the term of this patent is extended or adjusted under 35 U.S.C. 154(b) by 117 days.

(21) Appl. No.: 17/862,015

(22) Filed: Jul. 11, 2022

(65) Prior Publication Data
US 2024/0097584 A1    Mar. 21, 2024

(51) Int. Cl.
| | | |
|---|---|---|
| H02P 9/08 | (2006.01) | |
| H02J 3/40 | (2006.01) | |
| H02P 1/56 | (2006.01) | |
| H02P 5/68 | (2006.01) | |
| H02P 9/14 | (2006.01) | |

(52) U.S. Cl.
CPC . *H02P 1/56* (2013.01); *H02P 5/68* (2013.01)

(58) Field of Classification Search
CPC .................................. H02P 1/56; H02P 5/68
USPC ........................................................ 318/700
See application file for complete search history.

(56) References Cited

U.S. PATENT DOCUMENTS

| | | | |
|---|---|---|---|
| 3,646,356 A | | 2/1972 | Hoffman |
| 4,949,021 A | | 8/1990 | Rozman et al. |
| 5,387,859 A | * | 2/1995 | Murugan ............ H02M 5/4585 |
| | | | 290/46 |
| 6,198,176 B1 | * | 3/2001 | Gillette ..................... H02J 9/08 |
| | | | 307/64 |
| 8,299,762 B2 | | 10/2012 | Rozman et al. |
| 9,209,741 B2 | | 12/2015 | Gao et al. |
| 10,263,553 B2 | | 4/2019 | Blackwelder et al. |
| 10,720,866 B2 | | 7/2020 | Blackwelder et al. |
| 2011/0133703 A1 | * | 6/2011 | Rozman .................. H02P 9/302 |
| | | | 310/198 |
| 2012/0223531 A1 | | 9/2012 | Brooks et al. |
| 2012/0306458 A1 | | 12/2012 | Fogarty et al. |
| 2013/0049479 A1 | * | 2/2013 | Hedquist ................... H02J 3/46 |
| | | | 307/84 |
| 2015/0180280 A1 | * | 6/2015 | Frampton ................. H02J 3/48 |
| | | | 307/53 |
| 2018/0316175 A1 | * | 11/2018 | Gubba Ravikumar .. H02H 3/46 |
| 2020/0153251 A1 | * | 5/2020 | Frampton ................. H02J 3/42 |

OTHER PUBLICATIONS

Extended European Search Report in European Appln. No. 23175395.5, mailed on Dec. 6, 2023, 9 pages.

* cited by examiner

*Primary Examiner* — Gabriel Agared
(74) *Attorney, Agent, or Firm* — Fish & Richardson P.C.

(57) ABSTRACT

The present disclosure contemplates a method for synchronizing a large number of generators on an AC bus simultaneously by closing the generator breakers when the generators are rotating but de-energized. Then excitation is raised for each generator simultaneously, causing the generators to synchronize as voltage increases, without large transient current surges that can damage the machines. In order to safely maximize the rate at which excitation is raised, initial excitation can be controlled using current regulation, specifically controlling excitation current instead of voltage. Once a predetermined voltage is reached, a control scheme can be switched to a voltage regulation mode, which brings the generator to the final desired voltage.

15 Claims, 6 Drawing Sheets

MULTI GENERATOR SYNCHRONIZATION SYSTEM

TECHNICAL FIELD

This disclosure generally relates to synchronizing electric machines.

BACKGROUND

Synchronous electric machines often generate electrical power at a specific phase and frequency which depends on the speed and position of the prime mover of the electric machine. When closing a breaker between two alternating current (AC) electrical systems, if the phase, voltage, and frequency aren't synchronized, then large current surges and damage to components and equipment can occur. Conventionally, when two or more generators are to operate in parallel, a first generator is brought online to supply the AC bus. The second generator is then synchronized to the AC bus and, once synchronized, a breaker between the second generator and the AC bus can be closed. Additional generators can then be synchronized and added to the bus, one by one, until enough generators are online to supply the required load. Once enough generators are online, a main breaker, or supply breaker can be closed to energize loads.

SUMMARY

In general, the disclosure involves methods and systems for performing a startup of two or more synchronous machines. The method includes mechanically rotating each of the synchronous machines at a predetermined speed, electrically connected each of the synchronous machines to a power distribution bus, and raising an excitation of each particular machine to achieve synchronized operation. Excitation is raised by applying a filed current to an exciter of the particular synchronous machine using a field current regulator to achieve a target field current. An output voltage is monitored for the particular synchronous machine and in response to the output voltage reaching a predetermined voltage threshold, a voltage regulator is activated to determine an input to the field current regulator. The voltage regulator and the field current regulator are configured to adjust the excitation to achieve a desired field voltage. A switchover command is transmitted through a communication link to at least one other synchronous machine of the two or more synchronous machines.

Implementations can optionally include one or more of the following features.

In some implementations, the communication link is monitored by each particular synchronous machine and in response to receiving from at least one other synchronous machines a switchover command, the voltage regulator is activated regardless of the output voltage of the particular synchronous machine.

In some implementations, the power distribution bus is de-energized when each of the synchronous machines are electrically connected.

In some implementations, the predetermined speed is a speed at which the synchronous machine is configured to generated alternating current power at a frequency in the range of 40 Hz to 80 Hz.

In some implementations, applying the field current to the exciter includes bypassing the voltage regulator while the output voltage of the particular synchronous machine is below the predetermined threshold.

In some implementations, the desired field current is a time function configured to reduce a start-up time of the synchronous machine. In some implementations, the time function is a ramp function.

In some implementations, the predetermined voltage threshold is in the range of 10% to 50% of a nominal operating voltage of the particular synchronous machine.

In some implementations, raising the excitation of each particular synchronous machine is performed simultaneously across the two or more synchronous machines using a C37.118 communications protocol. In some implementations, "simultaneously" means within less than 10 ms of each other.

In some implementations, the communications link includes an Ethernet communications system.

Particular embodiments of the subject matter described in this specification can be implemented so as to realize one or more of the following advantages. By explicitly controlling excitation current during start-up, the total current load in the exciter and generator is reduced, increasing machine life and reducing component wear. Additionally, because excitation current is controlled directly, in some instances generators can be brought from an unexcited state to full voltage output more rapidly without causing damage, and with less inrush current than exists in other synchronization solutions. This allows for faster paralleling of multiple generators on a single bus. Additionally, this allows for successful synchronization despite loads activating automatically once the bus reaches a certain voltage threshold.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

This disclosure describes redundant, reliable power supply systems and techniques for rapidly synchronizing synchronous electric machines to the bus, e.g., in the event of a power failure. Redundant power systems are used to supply critical infrastructure and other systems which require reliable, continuous power. For example, nuclear power plants, datacenters, cooled storage facilities or other installations can require a reliable, continuous power supply. Often two independent external power sources are redundantly routed through a series of buses to ensure that failure of any single component or power source will not result in a loss of power. In addition, local backup generators can be provided to supply power in the event that every external power source is lost. In some implementations, local backup generators need to be brought online and ready to supply power in a very limited period of time (e.g., less than 30 seconds, or less than 15 seconds, etc.) following an external power outage. Many backup generators are alternating current (AC) synchronous machines, which need to operate at the same speed, and in sync with any other generators on the bus, to ensure the bus is supplied with in-phase AC power. Synchronizing a generator, in order to prevent large currents or damage when closing a breaker and bringing the generator on the bus, can be a time consuming process, and is often done sequentially (e.g., one generator at a time), which is too slow for certain applications.

The present disclosure provides techniques for synchronizing multiple, e.g., a large number of, generators on an AC bus simultaneously by closing the generator breakers when the generators are rotating but de-energized (e.g., no excitation current is provided). The excitation current is raised for each generator simultaneously, causing the generators to synchronize as AC bus voltage increases, without large transient current surges that can damage the machines. In order to minimize the time spent synchronizing, excitation should be raised as quickly as possible. However, raising excitation voltage too quickly or unevenly can cause overcurrent conditions and generator cross-feed, where one generator acts as a motor, loading the other generators. This can cause delay in supplying power to loads and damage to components or equipment. In order to safely maximize the rate at which excitation is raised, initial excitation can be controlled using current regulation, specifically controlling excitation current instead of voltage. Once a predetermined voltage is reached, a control scheme can be switched to a voltage regulation mode, which brings the generator to the final desired voltage.

To help a person skilled in the art better understand the technical solutions in the present specification, the following clearly and comprehensively describes the technical solutions in the implementations of the present specification with reference to the accompanying drawings in the implementations of the present specification. The described implementations are merely some rather than all of the implementations of the present specification. All other implementations obtained by a person of ordinary skill in the art based on one or more implementations of the present specification without creative efforts shall fall within the protection scope of the implementations of the present specification.

Figure 1:
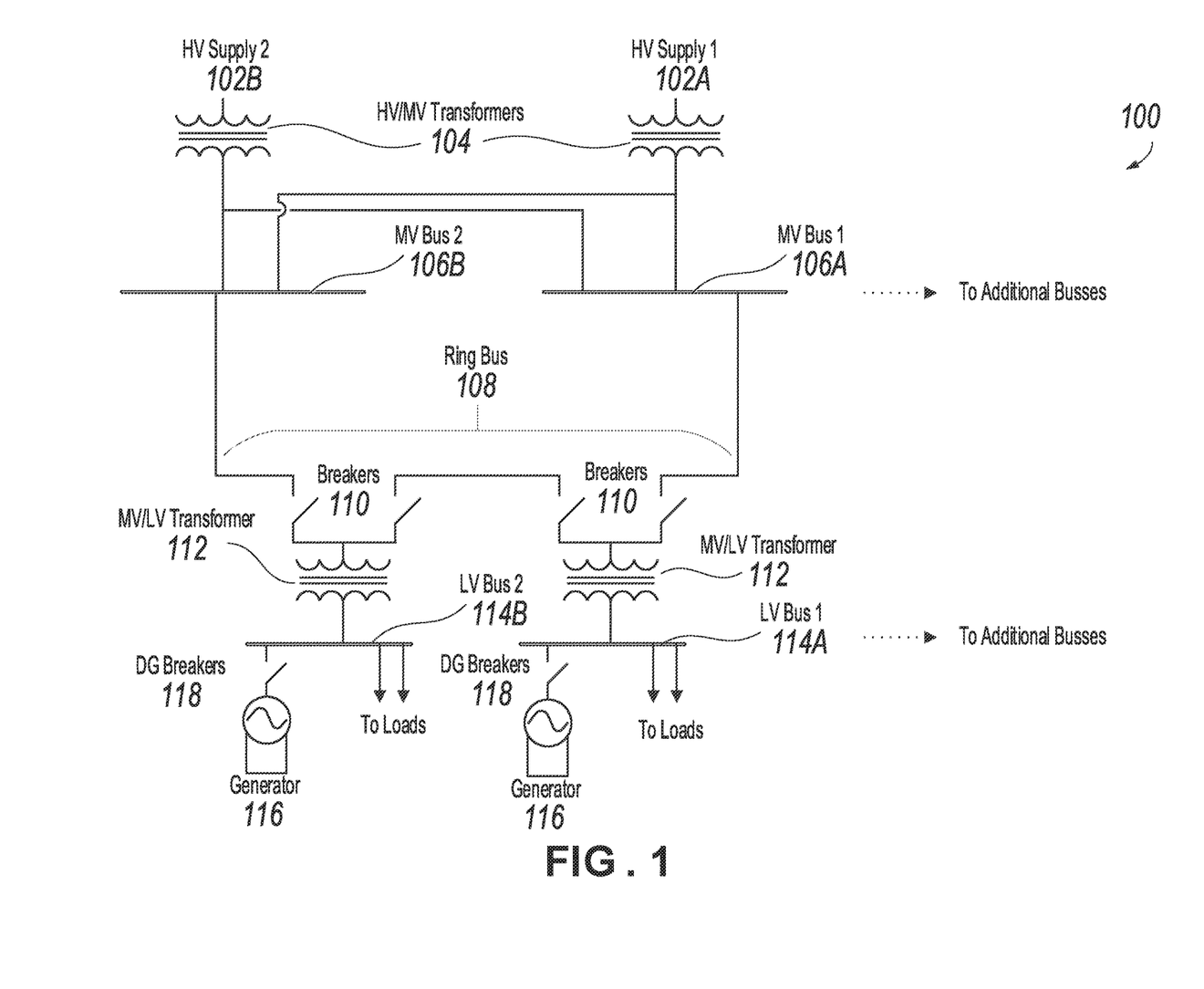
FIG. 1 depicts an example redundant power distribution architecture.

FIG. 1 depicts an example redundant power distribution system 100. The illustrated system 100 includes two high voltage (HV) power supplies 102A and 102B, although other quantities of HV power supplies can be used. These HV supplies 102A-B can be provided by a utility, or an external power plant. In some implementations, the HV supplies 102A-B are supplied at 13.8 kV or 22 kV and are provided by a local electrical grid.

High voltage to medium voltage transformers 104 step down the supplied HV energy to a medium voltage (MV) which can be, for example, 12.7 kV or 6.6 kV, amongst other voltages. These high voltage to medium voltage transformers 104 each independently supply two or more MV buses (106A and 106B). This redundant connection allows for a single HV supply (e.g., HV supply 2 102B) to power both (or all) MV buses. While only two MV buses are illustrated (106A and 106B), additional MV buses are possible. For example, a data center might employ sixteen separate MV buses, each redundantly supplied by two or more HV power supplies.

A ring bus 108 is used to supply two or more low voltage (LV) buses. In the illustrated implementation, four breakers 110 are provided to connect either MV bus 1 106A, MV bus 2 106B, or both to each of the MV to LV transformers 112. The breakers 110 can be configured to independently allow the MV/LV transformers 112 to be energized from either MV bus (or both). In the event a power failure or imminent power loss is detected on the ring bus 108 or either of the MV buses 106A or 106B, the breakers 110 can be opened to rapidly isolate the LV buses (114A and 114B) either from both MV buses 106A and 106B or a single MV bus 106A or 106B. MV/LV Transformers 112 can be bi-directional transformers, allowing power flow both ways. In this manner, a generator 116 on one LV bus (e.g., LV bus 114B) can supply loads to other LV buses through the MV/LV transformers 112.

The MV/LV transformers 112 can step voltage down from the MV busses (106 and/or 108) to, for example 600V or 480V in order to supply loads. Additionally one or more backup generators 116 can be connected to the LV buses 114A and 114B. In some implementations, a single generator 116 is connected to each LV bus 114, and there are a total of sixteen LV buses, with eight total ring buses being supplied from sixteen MV buses. In another implementation, eight ring buses are supplied from eight MV buses, supplying sixteen LV buses. Other combinations and configurations of redundant power supply systems are considered within the scope of this disclosure.

Some emergency backup systems connect backup generators to the MV buses (e.g., MV bus 1 106A and MV bus 2 106B) or the ring bus 108 via a separate backup bus and breaker system. In the illustrated implementations, the generators 116 are directly connected to the LV buses 114A and 114B via DG breakers 118. This is advantageous in that additional breaker operations (e.g., between the backup bus and the MV buses, as well as breakers 110) are not required to supply power to the LV buses 114A and 114B. An additional advantage is that if it is determined that a power outage is likely based on measured transients at either the HV supply or the MV buses, breakers 110 can be immediately opened, rapidly de-energizing the LV buses 114A and 114B, and allowing DG breakers 118 to be closed quickly, and in some instance, before power is totally gone from the MV buses 106A and 106B. This can enable faster switching to backup power, without the need to wait for the MV buses 106A and 106B to drop to low voltage before connecting a backup generator.

In some instances, during a power loss event, breakers 110 can initially be opened, isolating the MV buses 106A and 106B from loads. Concurrently, mechanical generators 116 can be started and brought up to speed, but not excited so as to remain de-energized. With the LV buses 114A and 114B de-energized, the DG breakers 118 can be closed. Once power has dissipated/gone from the ring bus 108, some of the breakers 110 can be closed to tie LV bus 1 114A to LV bus 2 114B. Then, with all generators 116 connected to de-energized buses, they can be excited, in order to start synchronizing and then producing power. Providing simultaneous excitation, and ensuring all of the generators 116 come online at or near the same time ensures they are able to supply adequate power to loads that become re-energized by the generators 116. The excitation or startup of the generators 116 can be rapidly performed according to methods described in greater detail below with respect to FIGS. 3 and 4.

Figure 2:
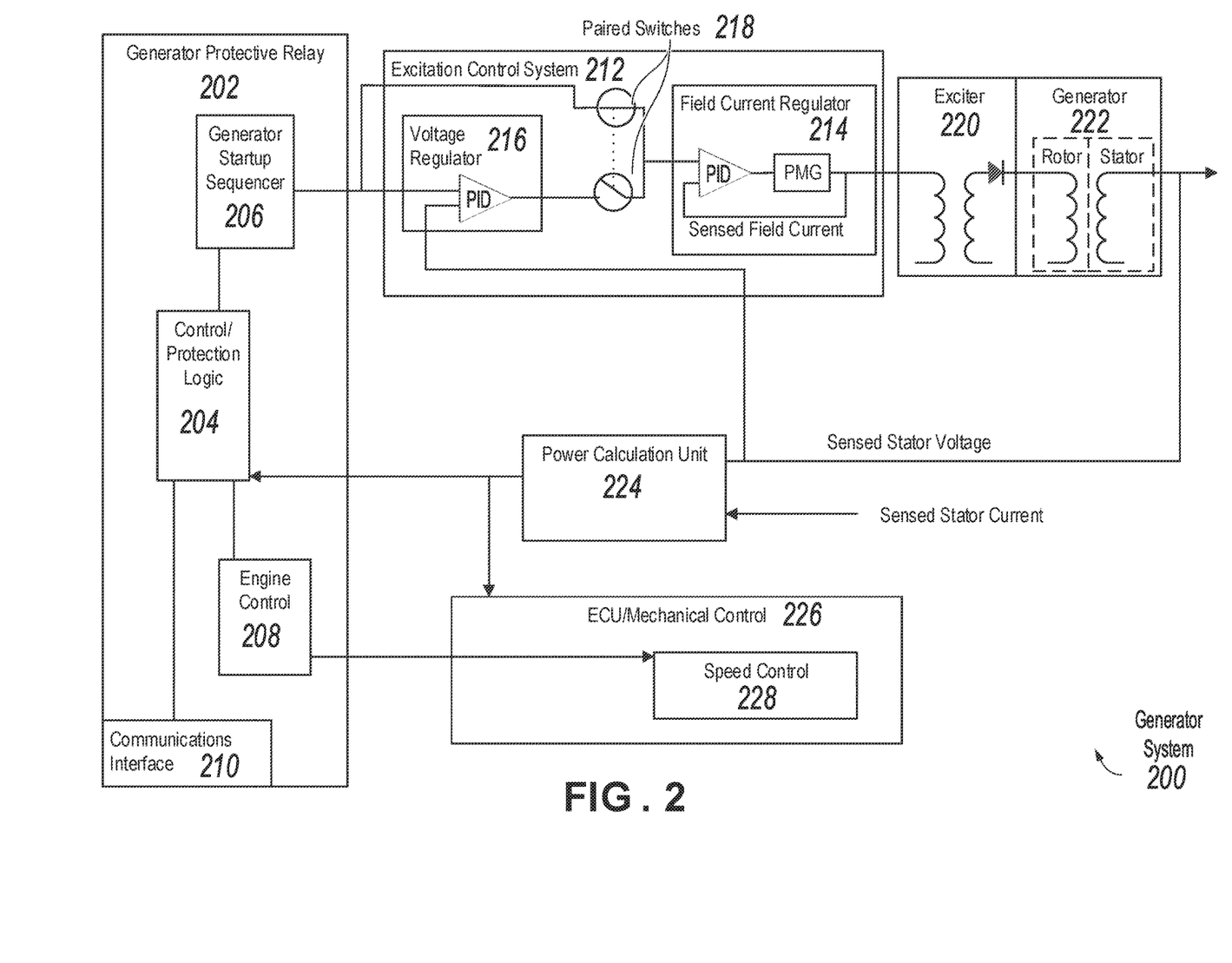
FIG. 2 is a block diagram illustrating a generator system.

FIG. 2 is a block diagram illustrating an example generator system 200. The generator system 200 includes a protective relay 202, an excitation control system 212, engine control unit (ECU) and mechanical control system 226 and an exciter 220 and generator 222. The generator 222 includes rotor windings and stator windings.

The protective relay 202 can be a high level controller for the generator, responsible for ensuring the generator 222 is protected from an overpower, over-voltage, and/or over-speed condition, among other things as well as controlling startup and some operation of the generator 222. The protective relay 202 includes control and protection logic 204 which receives a generator power calculation from a power calculation unit 224 and other operating parameters and determines whether the generator 222 is in a safe condition based on the generator power and other operating parameters. The control and protection logic 204 is configured to send an isolate command to trip the associated breaker and isolate the generator 222 from an electrical system to which the generator 222 is connected whenever a dangerous condition occurs. This can protect either the bus to which the generator 222 is connected and/or the generator 222 itself.

The protective relay 202 includes an engine control module 208, which interacts with (e.g., by sending commands to and receiving commands from) the ECU and mechanical control system 226 of an engine portion of the generator 222. The ECU and mechanical control system 226 regulates the speed of the prime mover using a speed control module 228. In synchronous applications, the rotational speed of the prime mover drives the output frequency of the generator 222. For example, a 3 pole pair synchronous generator rotates at 1200 revolutions per minute to generate 60 Hz AC power. In another example, a 5 pole pair synchronous generator provides 50 Hz AC power when rotating at 600 revolutions per minute. The engine control module 208 can send signals to the speed control module 228 to adjust engine speed in order to achieve a desired frequency.

Protective relay 202 includes a communications interface 210. The communications interface 210 is used by the generator system 200 for communicating with other systems in a distributed environment. For example, communications interface 210 can report the electrical or mechanical status of the generator system 200 to a central control hub, or to other generator systems operating their own protective relays. In instances where there are an array of generators, the relays 202 for each generator communicate in real-time or near real-time (e.g., within seconds or milliseconds). Generally, the communications interface 210 includes logic encoded in software and/or hardware in a suitable combination and operable to communicate with a network and other components. More specifically, the interface 210 can include software supporting one or more communication protocols associated with communications such that the protective relay 202 is operable to communicate physical signals within and outside of the illustrated system 200. In some implementations, the communications interface 210 communicates using serial or Ethernet-based communications with IEC 61850 Edition 2, EtherNet/IP, the IEEE 1588 Precision Time Protocol (PTP), IEC 60870-5-103, the IEC 62439 Parallel Redundancy Protocol (PRP), Mirrored Bits communications, Modbus, DNP3, and other protocols. The communication interface 210 can be communicably coupled to respective communication interfaces of other generator systems using an appropriate physical layer that includes one or more conductors. In some implementations, the protective relay is an SEL-700G series relay, or other suitable device.

The startup sequencer 206 comprises logic for performing the generator startup (e.g., operators for starting the generator 222) with the excitation control system 212. A set of paired switches 218 is operable to select whether or not the voltage regulator 216 of the excitation control system 212 is bypassed. When bypassed, the generator system 200 operates the generator in an excitation current control mode of operation. When not bypassed, the generator system 200 operated in a voltage control mode of operation.

In the illustrated position, the startup sequence generator 206 provides an input directly to the field current regulator 214. In this configuration, the generator startup sequencer 206 provides a target field current set-point, and the field current regulator 214 operates a permanent magnet generator to generate the target field current and provide it to the exciter 220. In this manner, with the paired switches 218 in the illustrated configuration, the protective relay 202 has direct control over the field current supplied to the exciter 220.

When the paired switches 218 are toggled, the input from the generator startup sequencer 206 is provided to the voltage regulator 216. The voltage regulator 216 receives as input a sensed stator voltage at the output of the generator 222, and adjusts a desired field current signal which is provided to the field current regulator 214 that, in turn, provides current to the exciter 220. In this manner, the protective relay 202 is controlling output voltage of the generator 222 instead of directly controlling field current. It should be noted that while proportional-integral-derivative (PID) controllers and feedback loops are illustrated, other suitable control schemes for regulating voltage and/or field current can be used and are considered within the scope of this disclosure. For example, a state space control algorithm utilizing a Kalman filter, a fuzzy logic control algorithm, or other modern control algorithm can be used.

In some implementations, and as discussed in further detail below with respect to FIGS. 3 and 4, the startup sequence generator 206 directly controls field current during initial startup. The field current regulator 214 is directly commanded in order to rapidly excite the generator 222 and raise output voltage without overloading the exciter coils or generator components. Once the output voltage has achieved a predetermined level (e.g., 0.3 per-unit of voltage or 30% of the target voltage, 0.4 per-unit voltage or 40% of the target voltage, or another appropriate level), the paired switches 218 can be toggled, and the generator startup sequencer 206 can begin controlling voltage of the generator 222, to raise it to its final output voltage. In some implementations, the paired switches 218 are field effect transistors (FETS) or other digital switches, and are actuated by a command signal from the protective relay 202. In some instances, the paired switches 218 are relay or solenoid actuated, with the relay or solenoid controlled by the protective relay 202. In some instances the predetermined level is adjustable (e.g., 0.5 per-unit of voltage, or 0.7 per-unit of voltage, etc.).

In addition to toggling paired switches 218, the protective relay 202 can also send, via the communication link 210, a switchover command to other generator systems performing a startup routine for their generators. The switchover command can instruct other generator systems that are starting up to actuated their paired switches, and shift from a current regulation mode to a voltage regulation mode, even if they have not achieved an output voltage set point. In this manner, even where the other generators may not have yet reached their predetermined level of output voltage, they can switch to regulating voltage, ensuring they are able to at least partially assist in supplying loads as the array generators come online. This ensures that a single generator is not attempting to supply power to the entirety of the loads, which may begin drawing current suddenly when a predetermined voltage exists on the bus. For example, with reference to FIG. 1, if the generator 116 supplying LV bus 2 114B begins supplying power, but the generator 116 supplying LV bus 1 114A is not yet regulating voltage, when the bus voltage reaches a certain threshold, loads on both LV bus 1 114A and LV Bus 2 114B may begin drawing power from a single generator, overloading it. By ensuring that the generators all switch to a voltage regulation mode near simultaneously, it can be assured they will be able to provide sufficient power to supply the loads.

Figure 3:
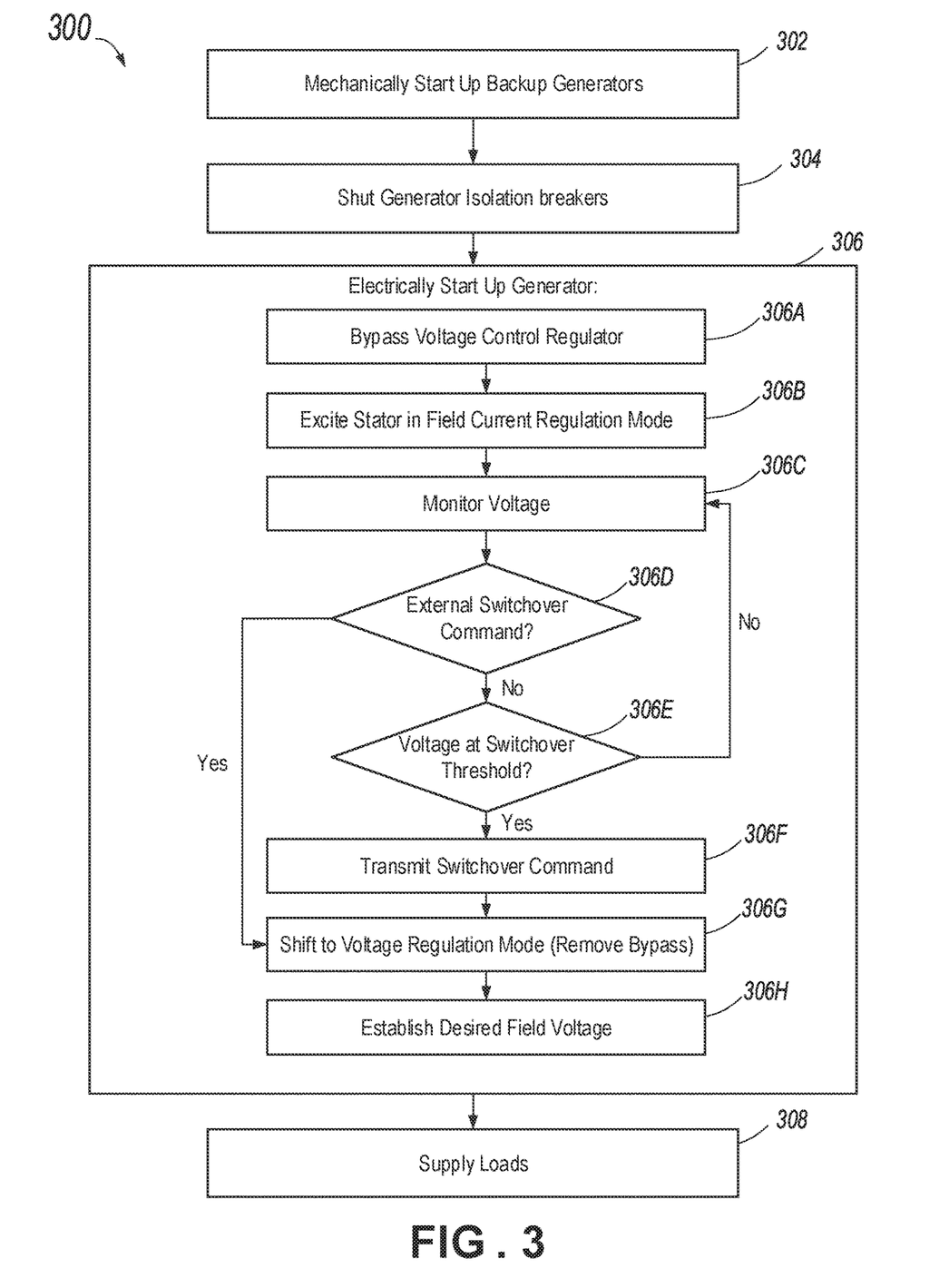
FIG. 3 depicts a flowchart illustrating an example method for synchronizing parallel generators.

FIG. 3 depicts a flowchart illustrating an example process 300 for synchronizing parallel generators. FIG. 3 generally shows process 300 for performing a startup of a backup generator such as generator 116 in a reliable power architecture, such as the one described with respect to FIG. 1. Process 300 can be executed by, for example, generator system 200 of FIG. 2.

At 302, a set of backup generators for supplying loads are mechanically started, and accelerated to operational speed (e.g., 1200 RPM, 3600 RPM, 720 RPM, 600 RPM, or other speed according to the design and configuration of the generator). This can be triggered by a startup command, based on a detected power outage, or a signal or sensor predicting an imminent power outage.

At 304, the generator isolation breakers are closed, electrically connecting the backup generators to a bus for providing power to the load(s). At this point, the generators are receiving no excitation, and therefore are not producing any significant power. The bus to which they are connected is similarly de-energized. By closing the breakers, or electrically connecting the generators prior to exciting the generators, they will be effectively automatically synchronized as the generators are started up electrically.

At 306, the generators are started up electrically. Electrical start up is initially done in a field current regulation mode and then later switched to a voltage control regulation mode. At 306A, the voltage control regulator is bypassed. This can be accomplished, for example, using a set of paired switches (e.g., paired switches 218 as described with respect to FIG. 2). In another example, a digital bypass can occur, or a different array of switches/connections can be used to switch between current control and voltage control. At 306B, the stator is excited in field current regulation mode. With the voltage regulator bypassed, the field current regulator can be directly controlled in order to raise the stator voltage of the generator. As stator voltage is being raised in field current regulation mode, the voltage is monitored at 306C. Additionally if an external switchover command (306D) is received, process 300 can skip ahead to 306G and shift to voltage regulation mode. During voltage monitoring (306C), periodic checks can be performed to identify an external switchover command. External switchover commands can come from other generators that have begun the switchover process themselves. In some implementations, a central controller monitors all the generators as they're being excited and when a specified number of generators achieves a predetermined voltage, the central controller can send a switchover command to all generators or at least to the ones that have achieved the predetermined voltage. As voltage continues to rise, and if no external switchover command is received, an assessment is performed as to whether the voltage has reached the switchover threshold. In some implementations, the switchover threshold is a predetermined voltage (e.g., 200V, 400V, or other value). In some implementations, the switchover threshold is a percentage of nominal voltage (e.g., 80% of 480V, or 33% of 600V, etc.). If the output stator voltage has not reached the switchover threshold, process 300 can return to 306C and continue to monitor voltage and repeat a check for an external switchover command. If the output stator voltage has reached the switchover threshold, at 306F a switchover command can be transmitted to other generators performing a startup, and then the generator can switch to a voltage regulation mode (306G).

Switching to voltage regulation mode 306G can include un-bypassing the voltage regulator that was bypassed in 306A. In some implementations, this is done by toggling a set of paired switches. In some implementations, the voltage regulator is simply energized and inputs are provided to the voltage regulator, which then provides inputs to a field current regulator. While in voltage regulation mode, the generator will establish the desired stator voltage (e.g., 480V, 600V, etc.) and the electrical startup of the generator can be considered complete.

At 308, the generator begins supplying loads. Because the generator was started while electrically connected to the bus it supplies, loads will automatically begin receiving power as the output voltage of the generator rises. In order to prevent overloading the generator at a low voltage, all of the generators can be excited simultaneously. Similarly, if one generator switches to voltage regulate mode, a command can be given to instruct all of the generators to switch, in order to ensure they are all capable of sharing loads to prevent tripping of any one generator. By electrically starting the connected generators, they will automatically be synchronized by the bus they are connected to as voltage rises. For example, if a particular generator is at a lagging phase, as voltage and frequency become established on the bus, the rotor of that particular generator will be torqued into the correct phase because of a slip angle between the rotor and the bus phase. In some implementations, if a generator is lagging or leading by more than a predetermined amount, a protective relay can trip the generator breaker, isolating the generator. That tripped generator can be synchronized and reconnected later using automatic synchronization, random paralleling, or another appropriate synchronization method.

Figure 4:
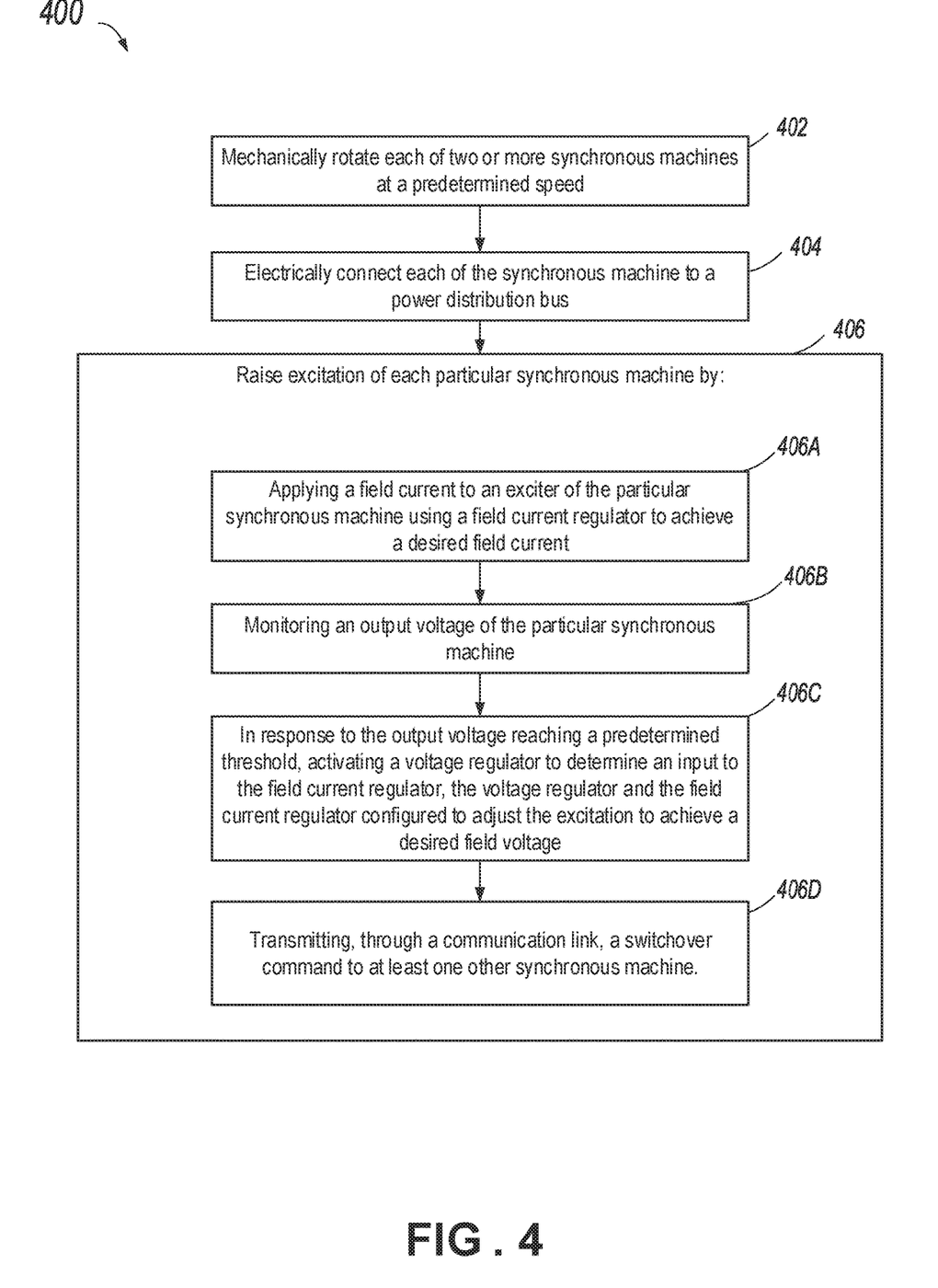
FIG. 4 is a flowchart illustrating an example method of performing a startup of two or more synchronous machines.

FIG. 4 is a flowchart illustrating an example process 400 of performing a startup of two or more synchronous machines. The synchronous machines can be, for example, the generators 116 of FIG. 1, and can be controlled by, for example, the system 200 as described with respect to FIG. 2. At 402, each of the two or more synchronous machines are rotated at a predetermined speed. The predetermined speed can be a speed associated with a target frequency for an AC generator. For example, the synchronous machines can be rotated at a speed such that they generate 60 Hz AC power (e.g., 3600 RPM).

At 404, each of the synchronous machines are electrically connected to a power distribution bus. In some instances, the power distribution bus directly supplies one or more loads (e.g., computer systems, pumps, lighting, etc.).

At 406, an excitation of each particular synchronous machine is raised by: applying a field current to an excited of the particular synchronous machine using a field current regulator to achieve a target field current (406A). While excitation is raised, an output voltage of the particular synchronous machine is monitored (408B), and in response to the output voltage reaching a predetermined threshold, a voltage regulator to determine an input to the field current regulator is activated (406C). The voltage regulator and the field current regulator are configured to adjust the excitation and achieve a desired field voltage. Additionally, a switchover command to at least one other synchronous machine is transmitted through a communication link (406D).

Optionally, while monitoring the output voltage of the particular synchronous machine, the method can also monitor the communication link and, in response to receiving a switchover command from at least one of the other synchronous machines, the voltage regulator can be activated regardless of the output voltage of the particular synchronous machine.

In some instances, the power distribution bus is de-energized when each of the synchronous machines are electrically connected.

In some instances, the predetermined speed is a speed at which the synchronous machine is configured to generate alternating current power at a frequency in the range of 40 Hz to 80 Hz.

In some instances, applying the field current to the excited includes bypassing the voltage regulator while the output voltage of the particular synchronous machine is below a predetermined threshold.

In some instances, the desired field current is a time function configured to minimize or at least reduce a start-up time of the synchronous machine. The time function can be, for example, a ramp input.

In some instances, the predetermined voltage is in the range of 10% to 50% of a nominal operating voltage of the particular synchronous machine. In some implementations, the nominal operating voltage is 480V.

In some instances, the communication link is an Ethernet communications system.

Figure 5:
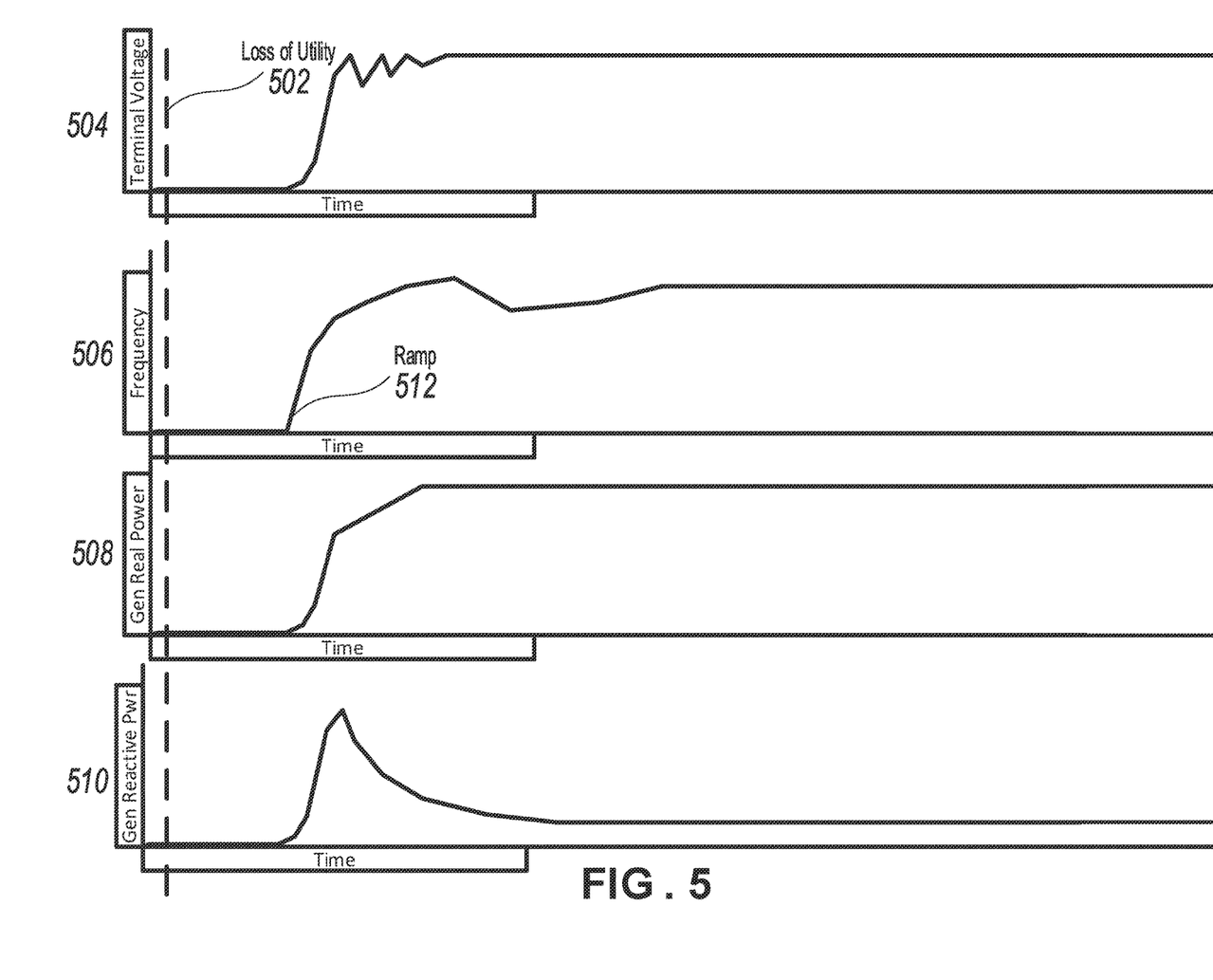
FIG. 5 illustrates example startup curves for a synchronous machine.

FIG. 5 illustrates example startup curves for a synchronous machine. A loss of utility event 502 occurs, and the generator startup sequence begins.

Voltage graph 504 illustrates the terminal voltage at the output of the generator during startup. Oscillations occur prior to reaching steady state due to loads energizing automatically as but voltage increases.

Frequency graph 506 illustrates the output frequency of the generator during startup. As can be seen during initial start up, the ramp 512 input control rapidly raises generator speed (and thus frequency) during start up, until a certain terminal voltage is achieved, and the generator switches to voltage control mode.

Real power graph 508, or active power graph illustrates the amount of power (e.g., in kilowatts) that is available for use provided by the example generator.

Reactive power graph 510 illustrates the reactive power during startup, which initially spikes, and then tapers down as excitation reaches a steady state value.

Figure 6:
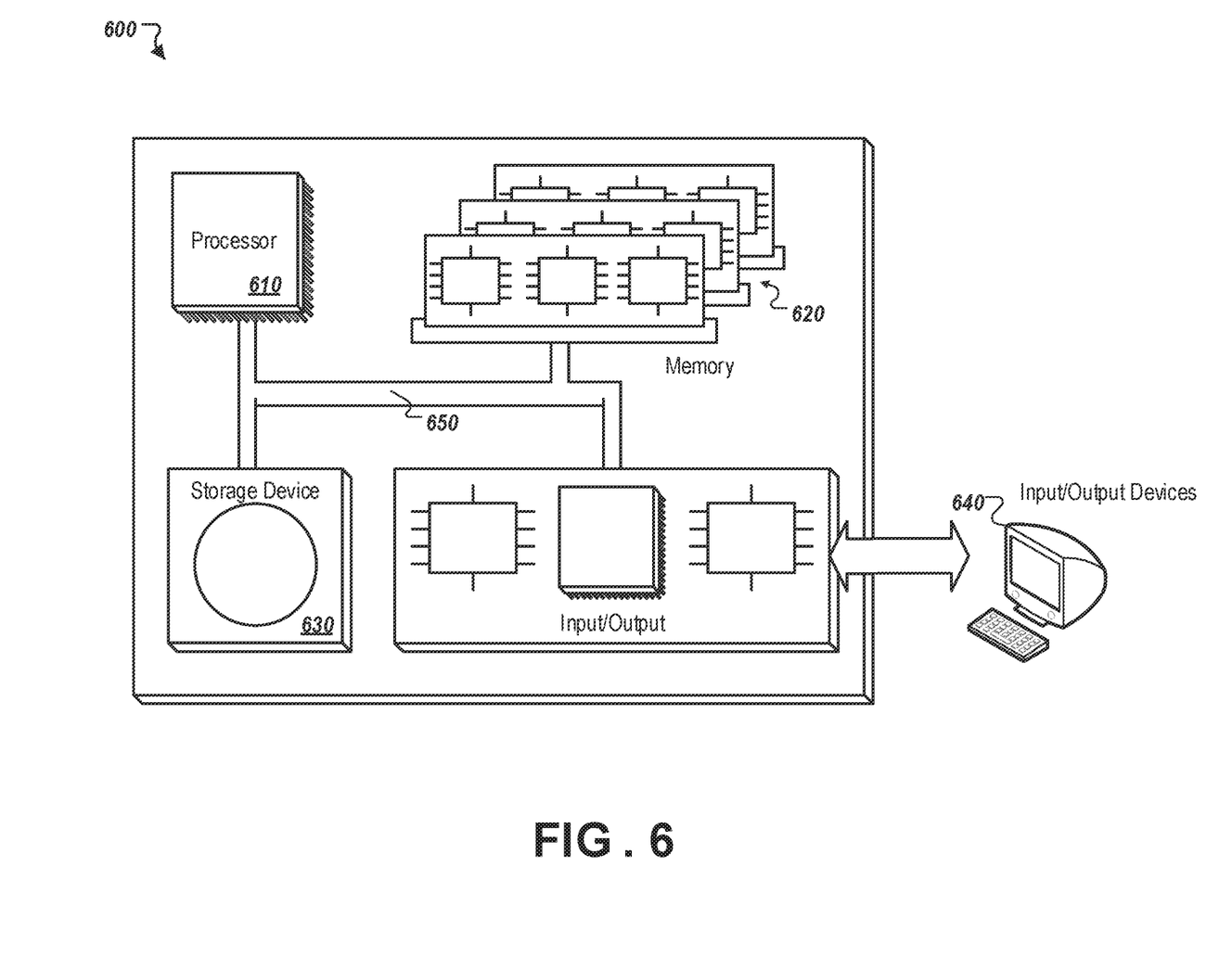
FIG. 6 is a schematic diagram of a computer system.

FIG. 6 is a schematic diagram of a computer system. The system 600 can be used to carry out the operations described in association with any of the methods described previously, according to some implementations. For example, system 600 can perform operations associated with process 300 of FIG. 3, process 400 of FIG. 4, or operations associated with certain elements as described in FIG. 2 (e.g., protective relay 202). In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Further to the descriptions above, a user may be provided with controls allowing the user to make an election as to both if and when systems, programs, or features described herein may enable collection of user information. In addition, certain data may be treated in one or more ways before it is stored or used, so that personally identifiable information is removed. For example, a user's identity may be treated so that no personally identifiable information can be determined for the user, or a user's skin data and/or diagnosis cannot be identified as being associated with the user. Thus, the user may have control over what information is collected about the user and how that information is used.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method for performing startup of two or more synchronous machines, the method comprising:
   mechanically rotating each of the synchronous machines at a predetermined speed;
   electrically connecting each of the synchronous machines to a power distribution bus, wherein the power distribution bus is de-energized when each of the synchronous machines are electrically connected;

raising an excitation of each synchronous machine to achieve synchronized operation by:
applying a field current to an exciter of the synchronous machine using a field current regulator to achieve a target field current;
monitoring an output voltage of the synchronous machine;
in response to the output voltage reaching a predetermined voltage threshold, activating a voltage regulator of the synchronous machine to determine an input to the field current regulator, wherein the voltage regulator and the field current regulator are configured to adjust the excitation to achieve a desired field voltage; and
transmitting, through a communication link and to at least one other synchronous machine of the two or more synchronous machines, a switchover command that instructs the at least one other synchronous machine to activate a voltage regulator of the at least one other synchronous machine;
monitoring, by each other synchronous machine, the communication link for the switchover command; and
in response to receiving the switchover command, activating the voltage regulator of the other synchronous machine regardless of the output voltage of the other synchronous machine.

2. The method of claim 1, wherein the predetermined speed for each synchronous machine is a speed at which the synchronous machine is configured to generate alternating current power at a frequency in a range of 40 Hz to 80 Hz.

3. The method of claim 1, wherein applying the field current to the exciter comprises bypassing the voltage regulator while the output voltage of the synchronous machine is below the predetermined voltage threshold.

4. The method of claim 1, wherein the target field current is a time function configured to reduce a start-up time of the synchronous machine.

5. The method of claim 1, wherein the predetermined voltage threshold is in a range of 10% to 50% of a nominal operating voltage of the synchronous machine.

6. The method of claim 1, wherein raising the excitation of each synchronous machine is performed simultaneously across the two or more synchronous machines using a C37.118 communications protocol.

7. The method of claim 1, wherein the communication link comprises an Ethernet communications system.

8. A system comprising two or more generator systems, each generator system comprising:
a synchronous machine;
an excitation control system including a voltage regulator and a field current regulator;
an exciter configured to supply excitation current to the synchronous machine; and
a controller, wherein the controller is configured to cause the generator system to perform operations for performing startup of two or more synchronous machines, the operations comprising:
mechanically rotating each of the synchronous machines at a predetermined speed;
electrically connecting each of the synchronous machines to a power distribution bus, wherein the power distribution bus is de-energized when each of the synchronous machines are electrically connected;
raising an excitation of each synchronous machine to achieve synchronized operation by:
applying a field current to an exciter of the synchronous machine using a field current regulator to achieve a desired field current;
monitoring an output voltage of the synchronous machine;
in response to the output voltage reaching a predetermined voltage threshold, activating a voltage regulator of the synchronous machine to determine an input to the field current regulator, wherein the voltage regulator and the field current regulator are configured to adjust the excitation to achieve a desired field voltage; and
transmitting, through a communication link and to at least one other synchronous machine, a switchover command that instructs the at least one other synchronous machine to activate a voltage regulator of the at least one other synchronous machine;
monitoring, by each other synchronous machine, the communication link for the switchover command; and
in response to receiving the switchover command, activating the voltage regulator of the other synchronous machine regardless of the output voltage of the other synchronous machine.

9. The system of claim 8, wherein the predetermined speed for each synchronous machine is a speed at which the synchronous machine is configured to generate alternating current power at a frequency in a range of 40 Hz to 80 Hz.

10. The system of claim 8, wherein applying the field current to the exciter comprises bypassing the voltage regulator while the output voltage of the synchronous machine is below the predetermined voltage threshold.

11. The system of claim 8, wherein the desired field current is a time function configured to minimize a start-up time of the synchronous machine.

12. The system of claim 8, wherein the predetermined voltage threshold is in a range of 10% to 50% of a nominal operating voltage of the synchronous machine.

13. The system of claim 8, wherein raising the excitation of each synchronous machine is performed simultaneously across the two or more synchronous machines using a C37.118 communications protocol.

14. The system of claim 8, wherein the communication link comprises an Ethernet communications system.

15. A non-transitory computer-readable storage medium coupled to one or more processors and having instructions stored thereon which, when executed by the one or more processors, cause a generator system to startup a synchronous machine of the generator system, by causing the generator system to perform operations, the operations comprising:
mechanically rotating each of the synchronous machines at a predetermined speed;
electrically connecting each of the synchronous machines to a power distribution bus wherein the power distribution bus is de-energized when each of the synchronous machines are electrically connected;
raising an excitation of each synchronous machine to achieve synchronized operation by:
applying a field current to an exciter of the synchronous machine using a field current regulator to achieve a desired field current;
monitoring an output voltage of the synchronous machine;
in response to the output voltage reaching a predetermined threshold, activating a voltage regulator of the synchronous machine to determine an input to the field current regulator, wherein the voltage regulator and the field current regulator are configured to adjust the excitation to achieve a desired field voltage; and transmitting, through a communication link and to at least one other synchronous machine, a switchover command that instructs the at least one other synchronous machine to activate a voltage regulator of the at least one other synchronous machine;

monitoring, by each other synchronous machine, the communication link for the switchover command; and in response to receiving the switchover command, activating the voltage regulator of the other synchronous machine regardless of the output voltage of the other synchronous machine.

* * * * *